Aug. 15, 1961 J. J. McCARTHY 2,996,587
SAFETY SIGNAL BELT
Filed Dec. 22, 1958
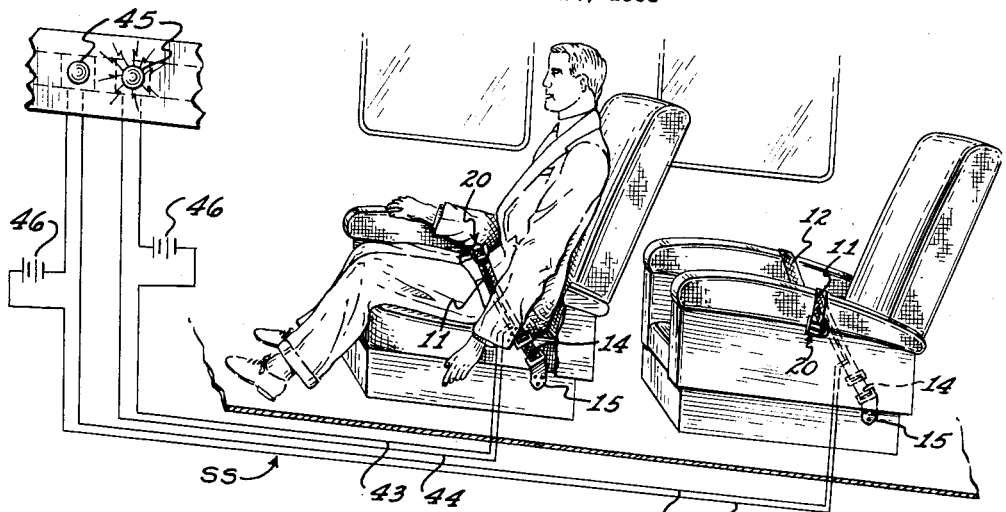
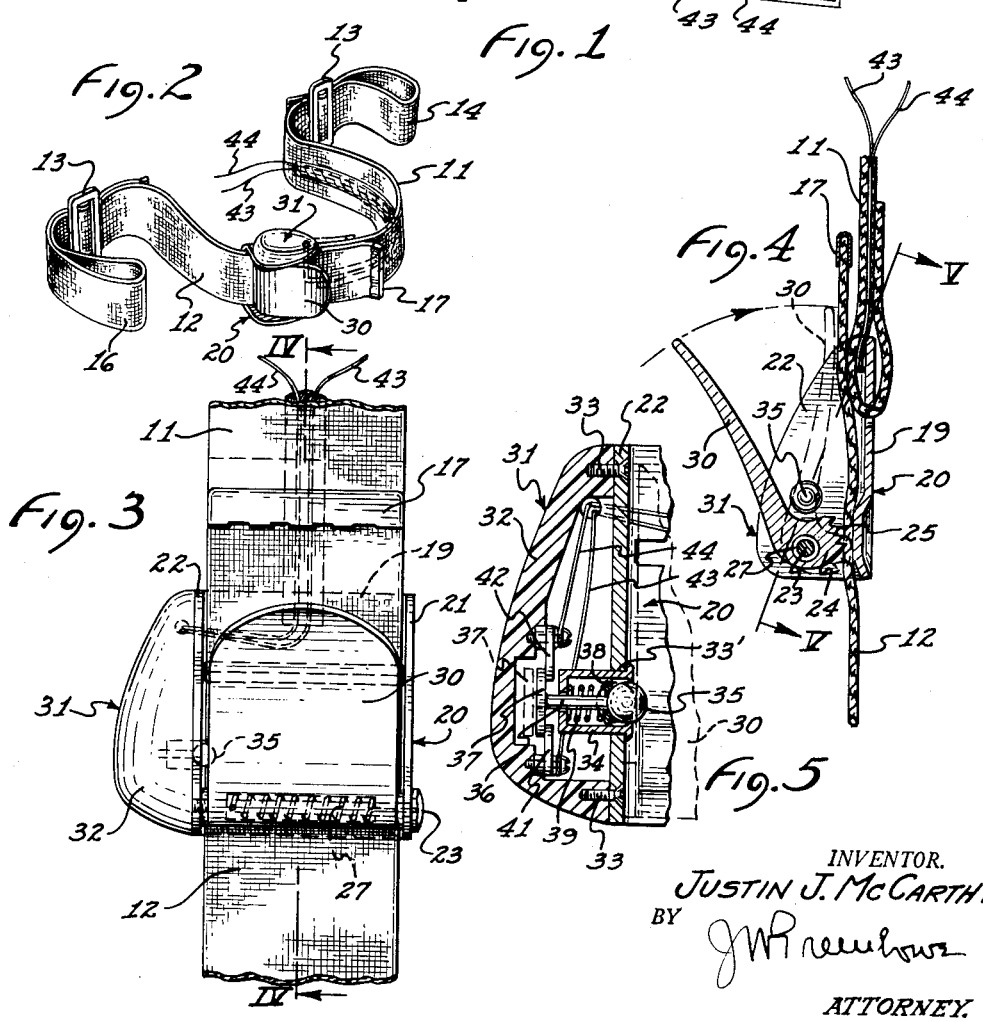
INVENTOR.
JUSTIN J. McCARTHY.
BY
ATTORNEY.

United States Patent Office 2,996,587
Patented Aug. 15, 1961

2,996,587
SAFETY SIGNAL BELT
Justin J. McCarthy, 3822 N. 32nd Way, Phoenix, Ariz.
Filed Dec. 22, 1958, Ser. No. 782,055
2 Claims. (Cl. 200—61.58)

The present invention relates to a safety belt of the type provided to secure a passenger against dislodgment from the seat of a conveyance, as for example when traveling by airplane, and relates more particularly to a safety belt which, when buckled about the body of a passenger, automatically gives visible indication, at a remote point, that the buckling operation has been performed.

Safety belts find use in various types of vehicles and are required as standard equipment for the seats of occupants in airplanes. In the relatively large type of commercial aircraft for transporting a comparatively large number of passengers, the seating arrangement extends the length of the cabin, and in some cases to separate compartments. When the order is given to fasten safety belts, it is the duty of the stewardess to check each passenger to make certain that the safety belt has been applied to protect the occupant against removal from the seat due to inertia upon a sudden termination of the movement of the conveyance or sudden decrease in its rate of speed.

The inspection of each seated passenger is time-consuming and often difficult, since the belt may be hidden by wraps or a blanket, making it necessary to disturb the passenger to ascertain whether or not the belt has been properly buckled, and in some cases, the time element makes it physically impossible for a complete check to be made.

It is an object of the present invention to provide a passenger safety belt so arranged and constructed as to avoid the need for the personal checking of each seated passenger.

Another object of the invention is to provide a belt buckle in combination with a switch for making and breaking a circuit and arranged for actuation upon movement of an element of the buckle.

A further object of the invention is to provide an airplane safety belt with a movable clamping member normally serving to break a signal circuit and to close the circuit when the buckle is in use.

Other objects and advantages of the invention will be more clearly understood from the following description together with the accompanying drawing in which:

FIG. 1 is a side view of seats of the type found in aircraft for passengers, illustrating the use of safety belts constructed in accordance with the present invention including a signal circuit;

FIG. 2 is perspective view of the safety belt constructed in accordance with the present invention;

FIG. 3 is fragmentary plan view of the belt buckle showing the buckle engaged with a belt section;

FIG. 4 is a view taken on line IV—IV in FIG. 3; and

FIG. 5 is an enlarged view, partly in cross-section, taken substantially on line V—V in FIG. 4, showing a portion of the hand piece of the buckle in dotted lines.

As shown, a safety belt of the type to which the present invention relates includes two strips or sections 11 and 12 of strong flexible material. Section 11 is provided with a keeper 13 to form loop 14 by means of which the section is secured to a bracket 15 in the usual manner, as shown in FIG. 1. The section 12 is also provided with a keeper 13 to form a loop 16 for securing the section to a bracket (not shown) at the opposite side of the seat. Thus the belt includes the two sections 11 and 12 secured at their ends at opposite sides of a seat for disposition across the lap of a seated passenger.

The free end of section 12 is provided with a metallic clip or end piece 17 for convenient threading into a buckle 20 which is secured to the free end of section 11. The type of buckle selected, to illustrate one practical embodiment of the present invention as shown in the drawing, includes a base plate 19 having side walls 21 and 22 which in conjunction with the base plate form a trough to receive the free end of section 12. Between the side walls, and journaled therein, is a shaft 23 on which is mounted an eccentric hub 24 (see FIG. 4) formed with teeth 25 to compress and grip the free end of section 12 when positioned in the trough of the buckle. Extending from the hub 24 is a hand piece 30 normally held in a lower position in close relation to the bottom of the trough by helical spring 27. When the free end of section 12 is disposed in the trough, the hand piece 30 is in its raised position as shown in FIG. 4, and teeth 25 engage and grip the section 12 as the belt is drawn tightly about the body of a seated passenger.

As stated, the buckle is of a well-known type extensively used as part of a safety belt in aircraft or other vehicles where necessary for the protection of a passenger.

In accordance with the present invention, a safety belt of the above type or other type may be readily and economically equipped with a signal circuit, indicated as a whole by the reference character SS, to give notice at a remote point that the buckle of the safety belt is in use. This is accomplished by a novel form of switch unit and circuit which, in the present case, serves to operate a signal or may be used as part of a circuit where it is desirable to prevent the operation of a vehicle unless the safety buckle is in use to secure the free ends of the belt.

The switch unit indicated as a whole by the reference numeral 31 may be of any selected construction, as for example, a mercury switch or of the micro-switch type.

As shown in FIG. 5, the switch unit selected, as one practical embodiment of the invention as applied to a buckle, includes a housing 32 which may be attached to the outer surface of a side wall 22 of the buckle 20 by any suitable means, as for example, by tap bolts 33. This side wall may be provided with a circular aperture 33' to receive one end of a casing 34, in which is disposed a spherical member such as a ball bearing 35. This member may, however, be of any practical form other than spherical and may be of non-conductive material. An end of the casing 34 is peened inwardly and is of a diameter to permit a portion of the ball to extend beyond the casing for engagement with the buckle hand piece 30 to operate means for breaking a circuit, as will be explained.

Extending from an opposite end of the casing 34 is a rod 36 of non-conductive material having a conductive contact member 37 at one end and a flange 38 at its opposite end held in contact with ball 35 by means of helical spring 39, causing a portion of the ball surface to normally extend from the casing 34 and in the path of movement of the buckle hand piece 30 when the buckle is not in operation and the hand piece is in its normal position. Thus the hand piece, as indicated in dotted lines in FIG. 4, causes the ball 35 to move and lift the rod member 36 to remove conductive member 37 from contact with conductive members 41 and 42 connected to conductors 43 and 44 respectively leading to signal 45 which may be an incandescent lamp. The lamp or other signal may be energized by any suitable source of power as indicated by reference numeral 46.

The conductors 43 and 44 which constitute the signal circuit pass from the switch housing 32 and are attached to the under side of section 11 of the belt as shown in dotted lines in FIG. 3, and thence to a signal such as the lamp 45 which may be at a remote point from the seat and in convenient position for observation by an attendant on the plane.

As stated above, when the belt buckle is not in operation to secure a belt section, the circuit is open and the signal inoperative. When the belt buckle is in use, the end 17 of section 12 is gripped by the teeth 25 on cam portion or hub 24 of hand piece 30. Thus the hand piece is in its raised position and out of contact with the ball or movable member 35. Helical spring 39 then serves to move the ball and bring conductor 37 into contact with conductors 41 and 42 to close the signal circuit and energize the lamp or other form of signal indicating that the belt buckle is in operation and engaged with the belt section 12. Upon a removal of the section 12 from the buckle, the hand piece will again move to its normal lower position under the action of helical spring 27 and engage the ball 35 to lift the conductor 37 and open the circuit to terminate the signal.

Although, as stated, any suitable form of movable member may be employed for contact with the hand piece to actuate the switch to keep the circuit open when the buckle is not in use, the ball member which rotates when contacted by the hand piece serves to reduce friction and has, in practice, been found to give satisfactory results.

As will be evident from the foregoing, safety belts on an aircraft or other vehicle may be equipped with the present signal system, making it only necessary for a stewardess to inspect the signals in order to be assured that the buckle of the safety belt of each passenger is in operation.

Although a preferred embodiment of the invention is shown and described herein, it is to be understood that modifications may be made therein without departing from the spirit and scope of the invention as set forth in the appended claims.

What is claimed is:

1. A buckle operated switch, said buckle having a base plate and lateral side walls providing a trough, a switch for controlling an electrical circuit mounted on one of said side walls, said switch having a movable contact member including a rotatable spherical member disposed in an aperture in the side wall on which the switch is mounted and extending into said trough, said buckle having a movable hand piece, said hand piece when moved relative to said side wall, engaging said spherical member to open said circuit, and means for actuating said contact member to close said circuit when said hand piece is moved from engagement with said spherical member.

2. A buckle operated switch, said buckle having a base plate and side walls providing a trough to receive an end of a strip of flexible material, said buckle including a hand piece having an eccentric hub journaled on a shaft between said side walls, said switch controlling an electrical circuit and mounted on one of said side walls, said switch having a contact member, an end of said contact member extending through the side wall on which said switch is mounted, said hand piece of said buckle engaging said contact member when said hand piece is disposed in close relation to the base plate of the buckle to engage and move said switch contact member to open said circuit and means for moving said switch contact member to close said circuit when the hand piece of the buckle is moved from engagement with the switch contact member to bring said eccentric hub into firm contact with said strip of material to secure said strip in said trough.

References Cited in the file of this patent

UNITED STATES PATENTS

| | | |
|---|---|---|
| 1,230,357 | Woodrow | June 19, 1917 |
| 1,717,057 | Meuer | June 11, 1929 |
| 2,469,120 | Kropp | May 3, 1949 |
| 2,510,115 | Jakosky | June 6, 1950 |